United States Patent
Provost

(10) Patent No.: US 9,670,874 B2
(45) Date of Patent: Jun. 6, 2017

(54) SEAL FOR A THRUST REVERSER OF A TURBOJET ENGINE NACELLE

(71) Applicant: AIRCELLE, Gonfreville l'Orcher (FR)

(72) Inventor: Fabrice Provost, Notre-Dame-du-Bec (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 15/093,798

(22) Filed: Apr. 8, 2016

(65) Prior Publication Data

US 2016/0222916 A1 Aug. 4, 2016

Related U.S. Application Data

(63) Continuation of application No. PCT/FR2014/052563, filed on Oct. 9, 2014.

(30) Foreign Application Priority Data

Oct. 11, 2013 (FR) .................................... 13 59914

(51) Int. Cl.
| | |
|---|---|
| F02K 1/72 | (2006.01) |
| F02K 1/80 | (2006.01) |
| F16J 15/02 | (2006.01) |
| F02K 1/56 | (2006.01) |
| F01D 11/00 | (2006.01) |
| F16J 15/06 | (2006.01) |

(52) U.S. Cl.
CPC ............ *F02K 1/566* (2013.01); *F01D 11/005* (2013.01); *F02K 1/72* (2013.01); *F02K 1/805* (2013.01); *F16J 15/027* (2013.01); *F16J 15/061* (2013.01); *F05D 2220/323* (2013.01); *F05D 2240/128* (2013.01); *F05D 2240/55* (2013.01); *F05D 2250/182* (2013.01); *F05D 2260/30* (2013.01)

(58) Field of Classification Search
CPC ................. E06B 7/2305; E06B 7/2307; F02K 1/46–1/805
USPC .............................................. 49/498.1, 493.1
See application file for complete search history.

(56) References Cited

U.S. PATENT DOCUMENTS

| | | | | |
|---|---|---|---|---|
| 767,763 | A * | 8/1904 | Reinvaldt | F16J 15/061 |
| | | | | 277/640 |
| 2,130,017 | A * | 9/1938 | Lewis | F25D 23/087 |
| | | | | 220/DIG. 3 |
| 2,608,728 | A * | 9/1952 | Montgomery | B61D 19/00 |
| | | | | 49/493.1 |
| 2,671,935 | A * | 3/1954 | Flues | B60J 10/80 |
| | | | | 296/76 |

(Continued)

FOREIGN PATENT DOCUMENTS

| | | |
|---|---|---|
| CA | 2642777 | 5/2010 |
| FR | 2914957 | 10/2013 |

OTHER PUBLICATIONS

International Search Report for International Application PCT/FR2014/052565, mailed Feb. 5, 2015.

*Primary Examiner* — Gerald L Sung
*Assistant Examiner* — Rene Ford
(74) *Attorney, Agent, or Firm* — Burris Law, PLLC

(57) ABSTRACT

The present disclosure relates to a seal for an aircraft turbojet engine nacelle thrust reverser, the seal having body having a cross section with respect to a longitudinal axis of the seal that is substantially circular, and a base which is intended to be mounted in a seal support. The seal is notable in that the base of said seal has apertures spaced from each other.

13 Claims, 2 Drawing Sheets

(56) References Cited

U.S. PATENT DOCUMENTS

| | | | | |
|---|---|---|---|---|
| 2,683,907 A | * | 7/1954 | Lovasik | F16J 15/121 |
| | | | | 138/106 |
| 2,794,219 A | * | 6/1957 | Macklanburg | E06B 7/2316 |
| | | | | 49/469 |
| 3,226,780 A | * | 1/1966 | Landis | E06B 7/2309 |
| | | | | 49/368 |
| 3,371,445 A | * | 3/1968 | Herr | E06B 7/2309 |
| | | | | 49/368 |
| 3,562,957 A | * | 2/1971 | Landis | E06B 7/2318 |
| | | | | 49/479.1 |
| 4,099,763 A | | 7/1978 | Maier et al. | |
| 4,182,501 A | * | 1/1980 | Fage | B64C 25/423 |
| | | | | 239/265.19 |
| 4,575,099 A | * | 3/1986 | Nash | F02K 1/805 |
| | | | | 239/265.37 |
| 5,376,423 A | * | 12/1994 | Wiegand | F16B 7/0426 |
| | | | | 24/289 |
| 2006/0220328 A1 | * | 10/2006 | Deaver | B60J 10/08 |
| | | | | 277/644 |
| 2006/0230686 A1 | * | 10/2006 | Plum | B60J 5/0405 |
| | | | | 49/498.1 |
| 2010/0044466 A1 | * | 2/2010 | Vauchel | F01D 11/005 |
| | | | | 239/265.11 |

* cited by examiner

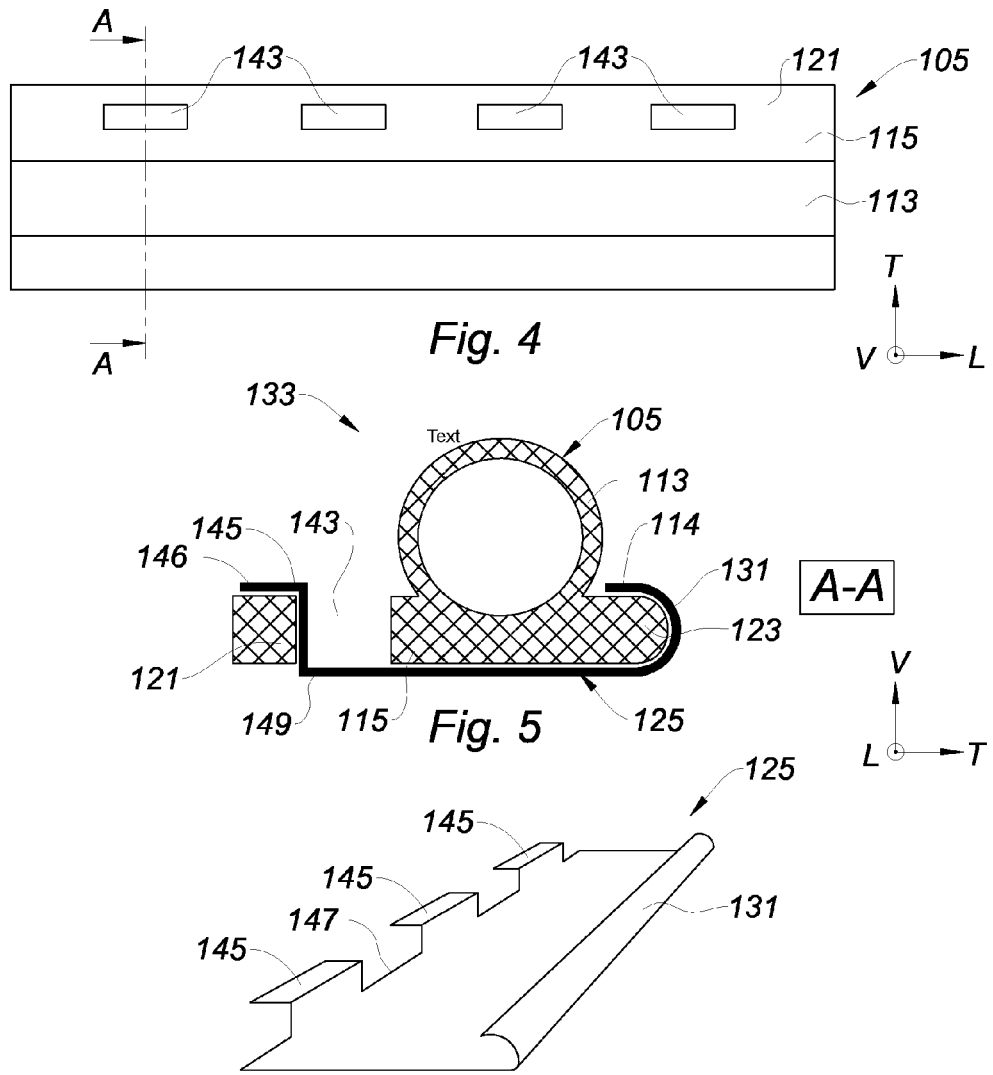
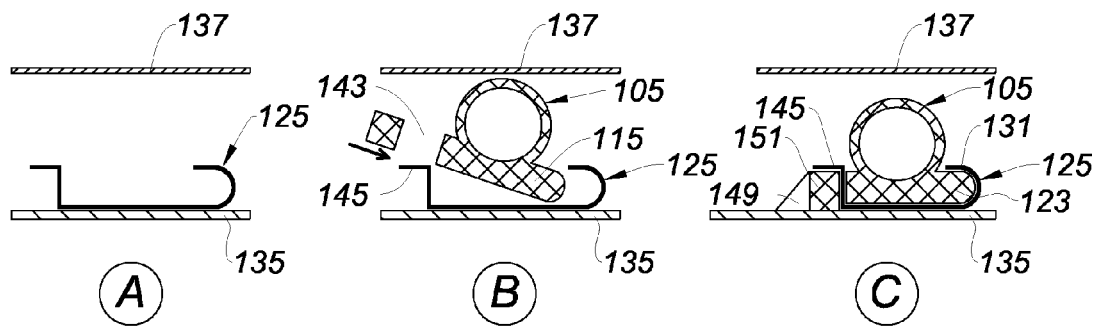

SEAL FOR A THRUST REVERSER OF A TURBOJET ENGINE NACELLE

CROSS-REFERENCE TO RELATED APPLICATIONS

This application is a continuation of International Application No. PCT/FR2014/052563, filed on Oct. 9, 2014, which claims the benefit of FR 13/59914, filed on Oct. 11, 2103. The disclosures of the above applications are incorporated herein by reference.

FIELD

The present disclosure relates to the field of seals intended to equip, for example, a thrust reverser of an aircraft turbojet engine nacelle.

BACKGROUND

The statements in this section merely provide background information related to the present disclosure and may not constitute prior art.

An aircraft is moved by several propulsion units each comprising a turbojet engine housed in a nacelle. A nacelle generally has a tubular structure along a longitudinal axis comprising a fixed upstream section constituted by an air inlet upstream of the turbojet engine, a fixed mid-section intended to surround a fan of the turbojet engine, and a downstream section accommodating thrust reversal means and intended to surround the combustion chamber of the turbojet engine, the upstream and downstream of the nacelle being defined with reference to the flow direction of the air flow in the nacelle in direct jet operation, the upstream of the nacelle corresponding to a portion of the nacelle through which the air flow penetrates, and the downstream corresponding to an ejection area of said air flow.

The role of a thrust reverser, during landing of an aircraft, is to improve the braking capacity thereof by redirecting forward at least a portion of the thrust generated by the turbojet engine. In this phase, the thrust reverser obstructs the flow path of the cold air flow passing through the nacelle, and directs the latter forward of the nacelle, thereby generating a counter-thrust which adds to the braking of the wheels of the plane.

The means implemented to achieve this redirecting of the cold flow vary depending on the thrust reverser type. However, in all cases, the structure of a thrust reverser comprises one or more movable cowl(s) displaceable between, on the one hand, a deployed position in which they open a passage in the nacelle intended to the deflected flow, and on the other hand, a retracted position in which they close this passage. These cowls may perform a deflection function or simply a function of activating other deflecting means.

In the case of a thrust reverser with vanes, also known as a cascade thrust reverser, the redirecting of the air flow is performed by cascade vanes, the thrust reverser cowl(s) simply sliding substantially along the longitudinal axis of the nacelle in order to uncover or cover these vanes. Complementary blocking doors, also called flaps, activated by the sliding of the cowling, generally allow for a closure of the flow path downstream of the vanes so as to optimize the redirecting of the cold flow.

In such a thrust reverser 1 with vanes 3 schematically represented in FIG. 1, it is necessary to provide a seal 5 made of an elastomeric material mounted on the cowl 7 and in contact with a deflecting edge 9 when the thrust reverser is in the closed position.

In this position, the air flowing in the cold air flow path 11 under the effect of a turbojet engine fan (members which are not shown) should not be able to escape from this flow path toward the vanes 3: the seal 5 allows achieving this sealing.

An embodiment of the seal 5 of the prior art viewed in cross-section is represented in FIG. 2.

The seal 5 comprises a flexible tubular body 13 and a relatively stiff base 15. The base 15 is planar at its upper support surface 17 on which the body 13 of the seal rests, and at its lower bearing surface 19. The end portions 21 and 23 of the base 15 are curved.

The seal 5 is generally mounted in a support 25, as illustrated in FIG. 3. Such a support typically has a "C"-shaped cross-section, complementary to the shape defined by the bearing surface 19 and by the end portions 21 and 23 of the base 15 of the seal 5.

The seal support 25 has a planar surface 27 and two curved end portions 29 and 31 corresponding to the end portions 21 and 23 of the base 15 of the seal 5.

The set 33 comprising the seal 5 mounted in its support 25 is intended to be positioned between two members 35 and 37, the member 37 being the one to be sealed.

The mounting of the seal in its support is generally made by inserting the base 15 of the seal 5, manually or using a tool, into its support 25.

However, the relatively little deformable structure of the base of the seal reduces the deformation capacity of this base, which complicates the insertion operation of the seal into its support.

A solution of the prior art allows simplifying the insertion and consists in substantially reducing the length of the planar surfaces 39 and 41 of the curved end portions 29 and 31 of the seal support 25. Indeed, by substantially reducing these lengths, the end portions 21 and 23 of the base 15 of the seal 5 penetrate more easily into the curved end portions 29 and 31 of the seal support.

However, such a limited overlapping may result in a disengagement of the seal from its support. In order to avoid such a disengagement, a solution consists in bonding a portion of the base of the seal into the seal support.

For this, it is known to bond either the bearing planar surface 19 of the base 15 of the seal on the planar surface 27 of the seal support 25, or the curved end portions 21 and 29 of the seal 5 into the curved end portions 29 and 31 of said support.

These bonding operations are time-consuming, expensive and tedious, and the bonding quality, that is to say the percentage of bonded surface, cannot be properly verified once the seal is mounted in its support. Furthermore, the presence of adhesive makes the replacement operations of the seal, when worn, complicated.

SUMMARY

The present disclosure provides a reliable and inexpensive technical solution allowing for an easy insertion of a seal into its support and avoiding pull-out.

To this end, the present disclosure relates to a seal for a thrust reverser of an aircraft turbojet engine nacelle, said seal comprising a body, the cross-section of which with respect to a longitudinal axis of the seal is, for example, substantially circular, and a base intended to be mounted in a seal support, notable in that said base has apertures spaced from each other.

Thus, by providing apertures in the base of the seal, the base of the seal according to the disclosure is shaped to receive means for holding the seal when the seal is mounted in its support. This allows providing a proper holding of the seal in its support and avoiding the seal disengagement from its support.

According to optional features of the seal according to the present disclosure:

the apertures are substantially aligned with each other along the longitudinal axis of the seal;

the apertures are positioned proximate to a longitudinal end portion of the base of the seal;

the apertures are substantially regularly spaced from each other;

the apertures have a substantially rectangular shape;

the apertures pass through the base of the seal along a substantially vertical axis of said seal;

The longitudinal end portion, proximate to which the apertures are positioned, has a substantially rectangular cross-section with respect to the longitudinal axis of the seal.

The present disclosure also concerns a set comprising a seal according to the teachings herein, the base of which is mounted in a seal support intended to receive said seal, said support comprising a plurality of holding tabs spaced from each other, said set being notable in that the holding tabs of the seal support pass through the apertures of the seal.

According to optional features relating to said set:

the holding tabs of the seal support are substantially aligned with each other along a longitudinal axis of said support;

the holding tabs of the seal support are positioned at a longitudinal end portion of the support;

the holding tabs of the seal support are substantially regularly spaced from each other;

the holding tabs of the seal support have a substantially "L"-shaped cross-section with respect to the longitudinal axis of the support;

the seal support comprises one single curved longitudinal end portion;

the longitudinal length of the holding tabs of the seal support is substantially equal to that of the apertures of the seal;

the transverse length of the holding tabs of the seal support is substantially equal to that of the corresponding longitudinal end portion of the base of the seal.

Finally, the present disclosure concerns a thrust reverser with vanes for an aircraft turbojet engine nacelle, comprising at least one cowl alternately movable between a position according to which it covers said vanes, and a position according to which it uncovers said vanes, said cowl being equipped with a set according to the present disclosure, in which the seal cooperates with a deflecting edge of this thrust reverser when said cowl covers said vanes.

DRAWINGS

In order that the disclosure may be well understood, there will now be described various forms thereof, given by way of example, reference being made to the accompanying drawings, in which:

FIG. 1 illustrates a thrust reverser equipped with a seal according to the prior art;

FIG. 2 schematically represents in cross-section a seal known from the prior art;

FIG. 3 illustrates the seal of FIG. 2 mounted in a support according to the prior art;

FIG. 4 schematically illustrates the seal according to the present disclosure, in top view;

FIG. 5 represents the set according to the present disclosure, comprising the seal mounted in its support, viewed in section along line A-A of FIG. 4;

FIG. 6 illustrates the support according to the present disclosure, in isometric view; and FIG. 7 schematically represents the steps for mounting the seal according to the present disclosure in the support according to the teachings of the present disclosure.

Figure 1:
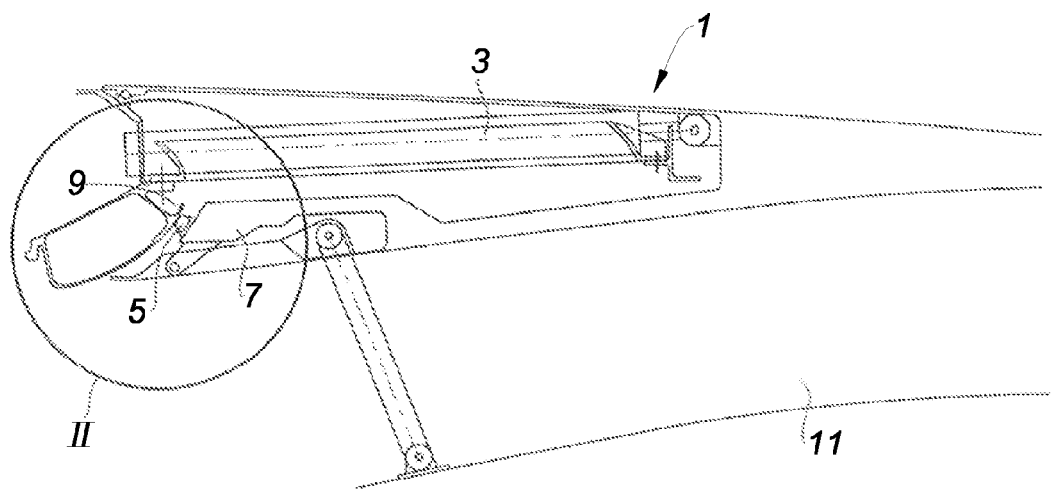
Figure 2:
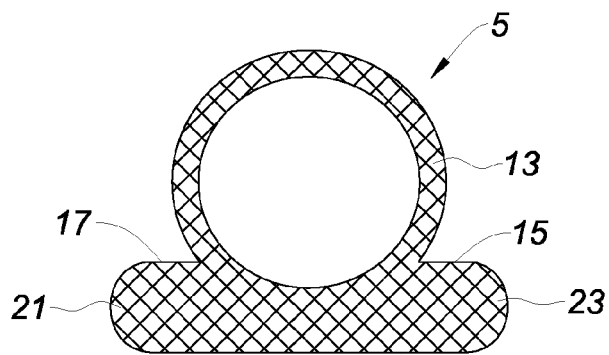
Figure 3:
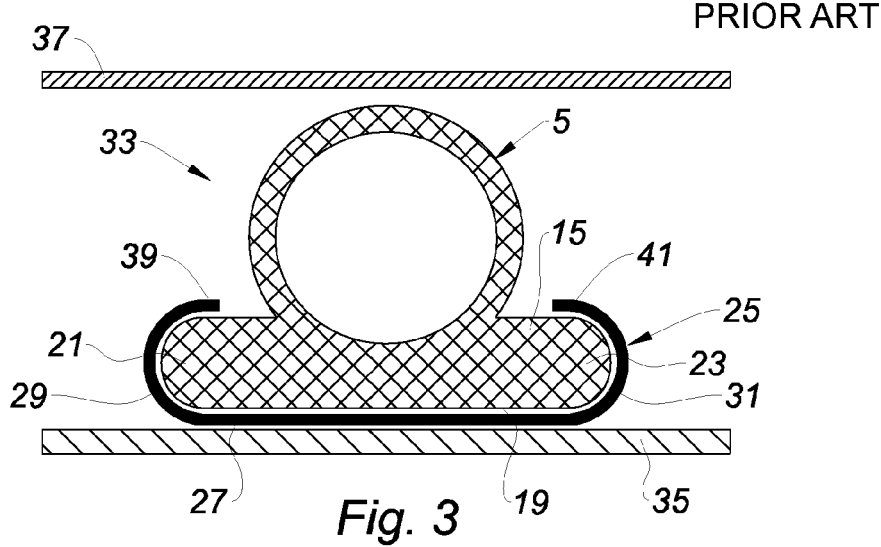

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all these figures, identical or similar references refer to identical or similar members or sets of members.

Moreover, in the description and the claims, the terminology longitudinal, vertical and transverse will be used with no limitation with reference to the trihedron L, V, T indicated in the figures.

Reference is made to FIG. 4, representing the seal according to one form of the present disclosure, as viewed from the top.

This seal 105 comprises a tubular body 113 and a base 115 receiving said body 113.

Of course, the body 113 of the seal may have a shape other than cylindrical, for example, parallelepipedic.

According to the present disclosure, the seal 105 has a plurality of substantially apertures 143, which are rectangular in one form.

These apertures 143 are spaced from each other and substantially aligned with each other along a longitudinal axis L of the seal 105.

The apertures 143 are in one form positioned proximate to a longitudinal end portion 121 of the base 115 of the seal 105, but it goes without saying that the apertures 143 may be moved, however, away from or closer to this longitudinal end portion, along the transverse axis T of the seal 105.

Furthermore, according to the variant represented in FIG. 4, the apertures 143 are regularly spaced from each other. This allows for a good distribution of forces when the seal 105 is mounted in its support. This variant is of course, not restrictive, and the apertures may not be regularly spaced from each other if those skilled in the art find a particular interest therein.

The apertures 143 form passages in the base 115 of the seal 105, from the upper support surface, on which the tubular body 113 rests, down to the lower bearing surface of the seal intended to be in contact with the seal support.

These apertured portions of the base of the seal, along the vertical axis of the seal allow, as described in more detail in the rest of the description, receiving holding tabs secured to the seal support ensuring the good holding of the seal in its support.

The seal 105 is intended to be mounted in a seal support, and held in this support at its base 115.

FIG. 5 illustrates such a mounting according to the present disclosure, viewed in cross-section along the line (AA) of FIG. 4.

The previously described seal 105 is inserted into its support 125 by the base 115 of said seal 133, forming a set 133.

The set thus constituted is, for example, intended to be positioned between an upstream portion of the cowl 7 (visible in FIG. 1) of a thrust reverser with vanes and the deflecting edge 9 of said thrust reverser, in order to inhibit the air flowing in the cold air flow path 11 under the effect of the fan of the turbojet engine from escaping from this flow path toward the vanes 3.

To this end, the seal 105 of the set 133 cooperates with the deflecting edge of the thrust reverser when the cowl covers the vanes of the thrust reverser.

Going back to FIG. 5, the longitudinal end portion 121, proximate to which the apertures 143 are positioned, has a substantially rectangular cross-section with respect to the longitudinal axis of the seal, whereas the opposite end portion 123 has a substantially inverted D-shaped cross-section.

The support 125 according to the present disclosure, on which the base 115 of the seal 105 rests, has, for its part, a plurality of angle bracket-shaped holding tabs 145, having a substantially "L"-shaped or "half-T"-shaped cross-section with respect to the longitudinal axis L of the support.

The holding tabs 145 are positioned at a longitudinal end portion 147 of the support 125 and pass through the apertures 143 of the seal 105.

As represented in FIG. 6 illustrating the support 125 according to the present disclosure in isometric view, the holding tabs 145 are in one form substantially aligned with each other along a longitudinal axis L of said support and substantially regularly spaced from each other.

The length of these holding tabs along the longitudinal axis of the support substantially corresponds to that of the openings 143 of the seal 105. However, according to specific application parameters, the length of these holding tabs may be caused to be reduced.

Referring again to FIG. 5, when the seal 105 is positioned in its support 125, the upper portion 146 of each holding tab 145 of the support (visible in FIG. 5) substantially covers the entire corresponding longitudinal end portion 121 of the base 115 of the seal 105. In other words, the transverse length of the holding tabs 145 of the support 125 is substantially equal to that of the corresponding longitudinal end portion 121 of the base 115 of the seal 105.

The holding tabs 145 of the support 125 are positioned at the planar longitudinal end portion 147 of the support, whereas the longitudinal end portion 131 opposite to said end portion 147 has a curved portion the cross-section of which with respect to the longitudinal axis of the support is substantially an inverted C-shape, complementary to that defined by the seal 105 disposed in the support.

The curved end portion 131 has a planar surface 141 of greater length than that generally provided in the prior art. This is made possible thanks to the unitary character of this curved end portion, which allows for an easy insertion of the seal into its support.

The mounting of the seal 105 into its support 125 is performed according to the following steps A to C, illustrated in FIG. 7:

step A: the support 125 is fastened beforehand on a member 135 facing the member 137 to be sealed, for example by bonding or welding, or by any other fastening means known to those skilled in the art;

step B: the seal 105 is positioned in its support 125, for example manually, by passing the holding tabs 145 through the openings 143 of the seal;

step C: the seal 105 is forcibly inserted without deforming the base 115 into the support 125. Such an insertion without deformation is allowed thanks to the apertures 143 which receive the holding tabs 145 of the support, thereby allowing sliding of the base of the seal without deformation, until achieving cooperation between the curved end portion 123 of the seal and the curved end portion 131 of the support. Once the seal is positioned in its support, adhesive 149 is disposed along the side wall 151 of the seal 105.

Thanks to the present disclosure, the insertion of the seal into its support 25 is greatly facilitated in comparison with the prior art, and the pull-out resistance of the seal from its support is enhanced.

The presence of apertures in the seal shaped so as to receive holding tabs of the seal support constitutes a solution simple to implement, thereby facilitating the insertion of the seal into its support and offering a good pull-out resistance.

Furthermore, the bonding operations are performed by means of the present disclosure at the side wall of the seal, and not at its bottom as provided for in the prior art, which allows reducing the amount of adhesive required for a good holding of the seal in its support.

In addition, the adhesive bead is also easy to achieve and control.

Finally, the present disclosure is not limited to the sole variations of these seals, seal supports, sets comprising the seal mounted in its support and thrust reverser provided with such sets, described above only as illustrative examples, but it encompasses, on the contrary, all variants involving the technical equivalents of the described variations as well as their combinations if these fall within the scope of the present disclosure.

What is claimed is:

1. A seal for a thrust reverser of an aircraft turbojet engine nacelle, said seal comprising a body having a cross-section of which with respect to a longitudinal axis (L) of the seal is substantially circular and a base mounted in a seal support affixed on a surface of the thrust reverser, wherein the base includes an end portion with a rectangular cross section and an opposite end portion having an inverted D-shaped cross section, the end portion with the rectangular cross section including apertures spaced from each other, the apertures formed normal to the surface, the seal support comprising holding tabs which have an L-shape, wherein each holding tab extends through one of the apertures.

2. The seal according to claim 1, wherein the apertures are substantially aligned with each other along the longitudinal axis (L) of the seal.

3. The seal according to claim 1, wherein the apertures are evenly spaced.

4. The seal according to claim 1, wherein the apertures have a substantially rectangular shape.

5. The seal according to claim 1, wherein the apertures extend through the base of the seal along a substantially vertical axis (V) of said seal.

6. The seal according to claim 1, wherein the holding tabs of the seal support are substantially aligned with each other along a longitudinal axis (L) of said seal support.

7. The seal according to claim 1, wherein the holding tabs of the seal support are positioned at a longitudinal end portion of the seal support.

8. The seal according to claim 1, wherein the holding tabs of the seal support are evenly spaced.

9. The seal according to claim 1, wherein the holding tabs of the seal support have a substantially "L"-shaped cross-section with respect to the longitudinal axis (L) of the seal support.

10. The seal according to claim 1, wherein the seal support comprises one single curved longitudinal end portion.

11. The seal according to claim 1, wherein a longitudinal length of the holding tabs of the seal support is substantially equal to a longitudinal length of the apertures of the seal.

12. The seal according to claim 1, wherein a transverse length of the holding tabs of the seal support is substantially equal to a transverse length of an end portion of the base of the seal.

13. The thrust reverser for an aircraft turbojet engine nacelle, comprising vanes and at least one cowl alternately movable between a position according to which the cowl covers said vanes, and a position according to which the cowl uncovers said vanes, said cowl being equipped with a seal according to claim 1, in which the seal cooperates with a deflecting edge of the thrust reverser when said cowl covers said vanes.

\* \* \* \* \*